(12) United States Patent
Sekiya et al.

(10) Patent No.: US 9,172,279 B2
(45) Date of Patent: Oct. 27, 2015

(54) AUTOMOTIVE EMBEDDED PERMANENT MAGNET ROTARY ELECTRIC MACHINE

(75) Inventors: Kosuke Sekiya, Tokyo (JP); Moriyuki Hazeyama, Tokyo (JP); Takeshi Mori, Tokyo (JP); Hideaki Arita, Tokyo (JP); Haruyuki Kometani, Tokyo (JP); Masaya Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 270 days.

(21) Appl. No.: 13/983,652

(22) PCT Filed: Feb. 2, 2012

(86) PCT No.: PCT/JP2012/052414
§ 371 (c)(1),
(2), (4) Date: Aug. 5, 2013

(87) PCT Pub. No.: WO2012/105656
PCT Pub. Date: Aug. 9, 2012

(65) Prior Publication Data
US 2013/0307365 A1    Nov. 21, 2013

(30) Foreign Application Priority Data

Feb. 4, 2011   (JP) ................ 2011-023053

(51) Int. Cl.
*H02K 21/12* (2006.01)
*H02K 1/27* (2006.01)
*H02K 29/03* (2006.01)

(52) U.S. Cl.
CPC ............. *H02K 1/276* (2013.01); *H02K 29/03* (2013.01)

(58) Field of Classification Search
USPC ............ 310/156.38–156.39, 156.43–156.46, 310/156.53, 156.56
See application file for complete search history.

(56) References Cited

U.S. PATENT DOCUMENTS

| 4,237,397 A | 12/1980 | Mohr et al. |
| 4,687,608 A | 8/1987 | Eino |

(Continued)

FOREIGN PATENT DOCUMENTS

| CN | 1729604 A | 2/2006 |
| JP | 55 56456 | 4/1980 |

(Continued)

OTHER PUBLICATIONS

International Search Report Issued May 1, 2012 in PCT/JP12/52414 Filed Feb. 2, 2012.

(Continued)

*Primary Examiner* — Thanh Lam
(74) *Attorney, Agent, or Firm* — Oblon, McClelland, Maier & Neustadt, L.L.P.

(57) ABSTRACT

An automotive embedded permanent magnet rotary electric machine can suppress increases in torque ripples and cogging torque, reduce core loss near a stator, and increase magnetic torque and reluctance torque. In the automotive embedded permanent magnet rotary electric machine, a first permanent magnet and a second permanent magnet that constitute a magnetic pole are embedded so as to line up in a main direction of rotation of magnetic poles of a rotor core and are embedded so as to be radially outwardly convex in a region that extends from a leading end portion to a trailing end portion in the main direction of rotation of the magnetic poles, and the first permanent magnet is formed into an integrated body that extends from the leading end portion in the main direction of rotation of the magnetic poles beyond a pole center toward a trailing side.

13 Claims, 8 Drawing Sheets

(56) References Cited

U.S. PATENT DOCUMENTS

| | | | |
|---|---|---|---|
| 6,812,614 B2* | 11/2004 | Yamamoto et al. | 310/261.1 |
| 7,498,707 B2* | 3/2009 | Kimura et al. | 310/156.01 |
| 7,898,137 B2* | 3/2011 | Miyata | 310/156.38 |
| 8,482,175 B2* | 7/2013 | Hauru et al. | 310/156.01 |
| 2002/0175584 A1* | 11/2002 | Koharagi et al. | 310/156.56 |
| 2005/0258698 A1* | 11/2005 | Miyashita et al. | 310/156.38 |
| 2006/0131976 A1 | 6/2006 | Kikuchi et al. | |
| 2007/0200447 A1* | 8/2007 | Adaniya et al. | 310/156.53 |
| 2009/0251023 A1* | 10/2009 | Nakano et al. | 310/156.38 |
| 2011/0062814 A1* | 3/2011 | Adaniya et al. | 310/156.53 |
| 2012/0267975 A1* | 10/2012 | Nishimura et al. | 310/156.01 |

FOREIGN PATENT DOCUMENTS

| | | |
|---|---|---|
| JP | 58 099251 | 6/1983 |
| JP | 2002 238193 | 8/2002 |
| JP | 2002-354721 | 12/2002 |
| JP | 2003 164085 | 6/2003 |
| JP | 2011 216836 | 10/2011 |
| KR | 10-0252392 B1 | 4/2000 |
| WO | 2004 064225 | 7/2004 |

OTHER PUBLICATIONS

Communication issued Jun. 24, 2014 in Japanese Patent Application No. 2012-555959 (with English translation).

* cited by examiner

AUTOMOTIVE EMBEDDED PERMANENT MAGNET ROTARY ELECTRIC MACHINE

TECHNICAL FIELD

The present invention relates to an automotive embedded permanent magnet rotary electric machine, and particularly relates to a magnet construction that can increase reluctance torque while ensuring a large magnetic torque.

BACKGROUND ART

Conventional embedded permanent magnet rotary electric machines include a rotor that has; a rotor yoke that is formed by laminating electromagnetic steel plates, and in which pairs of magnet insertion apertures are formed at a uniform angular pitch circumferentially so as to correspond to a number of poles; and permanent magnets that are inserted into the respective pairs of magnet insertion apertures (see Patent Literature 1, for example). In conventional embedded permanent magnet rotary electric machines, permanent magnets that have like magnetic poles are inserted into pairs of magnet insertion apertures, and permanent magnets that have different magnetic poles are inserted into adjacent pairs of magnet insertion apertures. In addition, grooves that partition the permanent magnets that have different magnetic poles are formed on the electromagnetic steel plates that constitute the rotor yoke.

CITATION LIST

Patent Literature

[Patent Literature 1]
Japanese Patent Laid-Open No. 2005-287262 (Gazette)

SUMMARY OF THE INVENTION

Problem to be Solved by the Invention

In conventional embedded permanent magnet rotary electric machines, because the magnetic poles of the rotor are constituted by pairs of permanent magnets that are produced so as to have identical shapes that are disposed so as to line up circumferentially, center ribs that are constituted by the electromagnetic steel plates between the pairs of permanent magnets must be positioned on circumferential centers of each of the magnetic poles. Thus, the magnetic flux that is produced by the permanent magnets has points of abrupt change, and some problems have been that magnetic flux harmonics increase, that torque ripples and cogging torque increase, and that core loss near the stator also increases. Because the permanent magnets that constitute the magnetic poles are also disposed so as to be symmetrical relative to the pole centers and perpendicular to the pole centers, another problem has been that reluctance torque and magnetic torque are reduced.

The present invention aims to solve the above problems and an object of the present invention is to provide an automotive embedded permanent magnet rotary electric machine that suppresses increases in torque ripples and cogging torque, that can reduce core loss near a stator, and that can increase magnetic torque and reactor torque by dividing regions of disposal of permanent magnets that constitute respective magnetic poles into leading regions of magnet disposal and trailing regions of magnet disposal in a direction of rotation during forward travel of a vehicle, making a circumferential width of the leading regions of magnet disposal in the direction of rotation greater than a circumferential width of the trailing regions of magnet disposal in the direction of rotation, and disposing the regions of magnet disposal so as to be radially outwardly convex.

Means for Solving the Problem

In order to achieve the above object, according to one aspect of the present invention, there is provided an automotive embedded permanent magnet rotary electric machine including: a rotor including: a rotor core; and a plurality of permanent magnets that are embedded in the rotor core so as to be positioned on a radially inner side of the rotor core, adjacent permanent magnets being magnetized so as to have different polarities from each other to constitute magnetic poles; and a stator including: a stator core in which teeth are respectively arranged at a uniform angular pitch circumferentially so as to extend radially inward from an annular core back; and a stator coil that is wound onto the stator core, the stator being disposed so as to surround the rotor. Each of the permanent magnets that constitute the magnetic poles includes a first permanent magnet and a second permanent magnet that are embedded so as to line up in a main direction of rotation of the magnetic poles of the rotor core so as to be radially outwardly convex in a region that extends from a leading end portion to a trailing end portion in the main direction of rotation of the magnetic poles, and the first permanent magnet is formed into an integrated body that extends from the leading end portion beyond a pole center toward the trailing side in the main direction of rotation of the magnetic poles.

Effects of the Invention

According to the present invention, because the first permanent magnet is formed into an integrated body that extends from the leading end portion beyond the pole center toward the trailing side in the main direction of rotation of the magnetic poles, magnetic material that constitutes the rotor core is not present at the pole center. Thus, because the peak of the magnetic flux that is produced by the permanent magnets is not reduced, and the magnetic flux that is produced by the permanent magnets does not have a point of abrupt change, magnetic flux harmonics are reduced. Increases in torque ripples and cogging torque are thereby suppressed, and core loss near the stator is also reduced.

Because the permanent magnets that constitute the respective magnetic poles are embedded in the rotor core so as to be radially outwardly convex, magnetic torque can be increased.

In addition, because the first permanent magnet is formed into an integrated body that extends from the leading end portion beyond the pole center toward the trailing side in the main direction of rotation of the magnetic poles, the permanent magnets that constitute the magnetic pole are asymmetric relative to the pole center, enabling reluctance torque to be increased.

DESCRIPTION OF EMBODIMENTS

Preferred embodiments of the automotive embedded permanent magnet rotary electric machine according to the present invention will now be explained with reference to the drawings.

Embodiment 1

Figure 1:
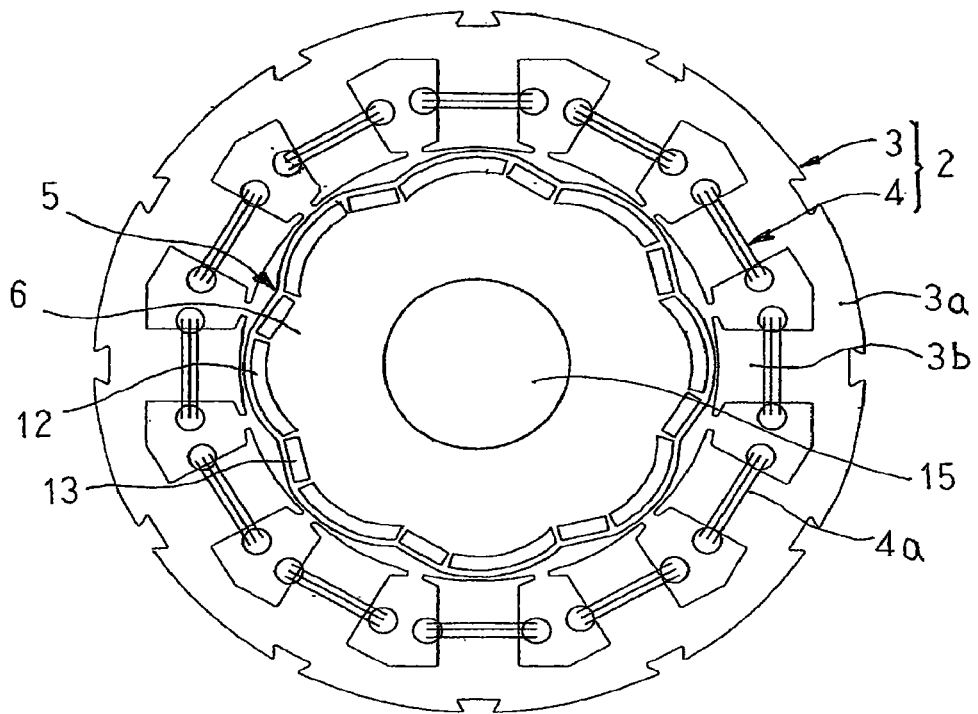
FIG. 1 is a cross section that schematically shows an overall configuration of a rotary electric machine according to Embodiment 1 of the present invention.
Figure 2:
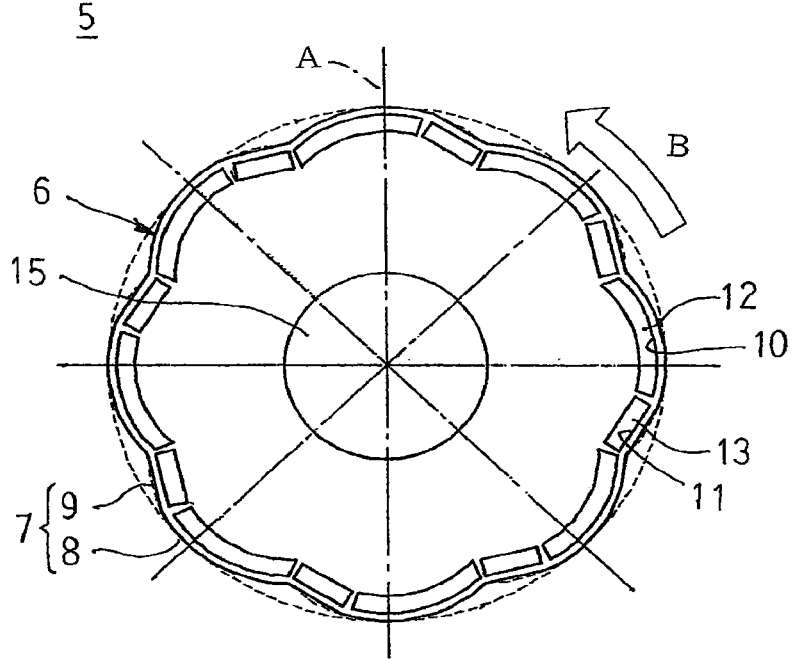
FIG. 2 is a cross section that schematically shows a rotor of the rotary electric machine according to Embodiment 1 of the present invention.
Figure 3:
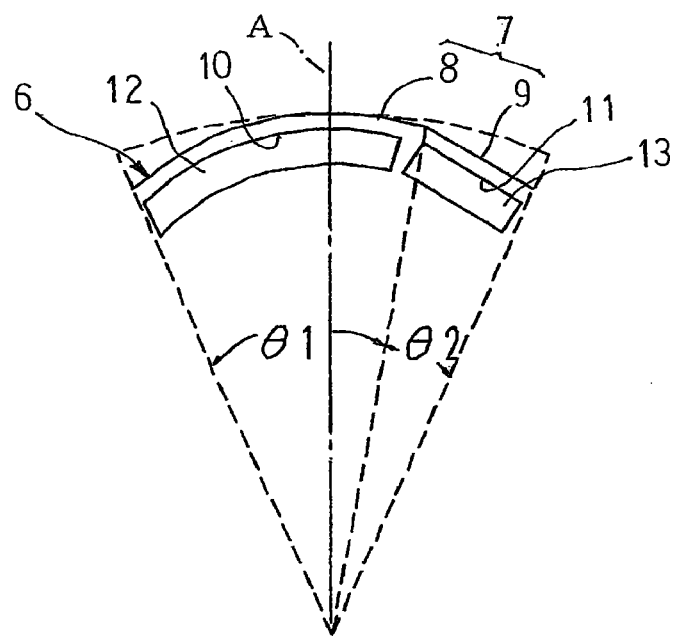
FIG. 3 is a partial cross section that explains a magnetic pole in the rotor of the rotary electric motor according to Embodiment 1 of the present invention.
Figure 4:
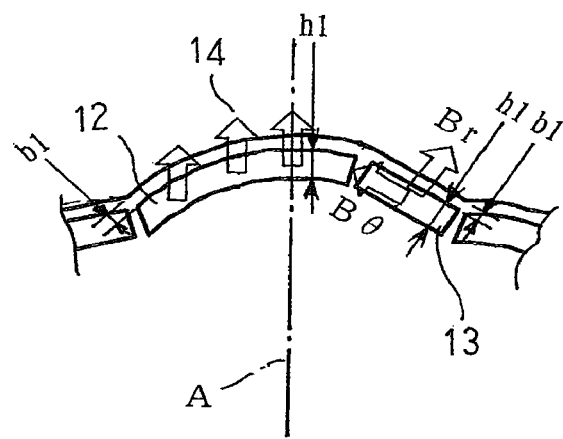
FIG. 4 is a partial cross section that explains directions of magnetization of magnets that constitute magnetic poles in the rotor of the rotary electric motor according to Embodiment 1 of the present invention.
Figure 5:
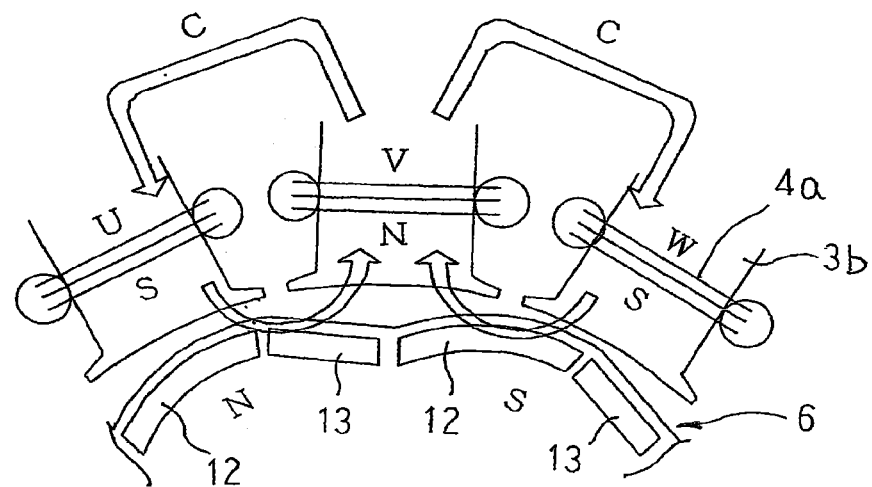
FIG. 5 is a schematic diagram that explains a demagnetizing mechanism in the rotor of the rotary electric motor according to Embodiment 1 of the present invention.
Figure 6:
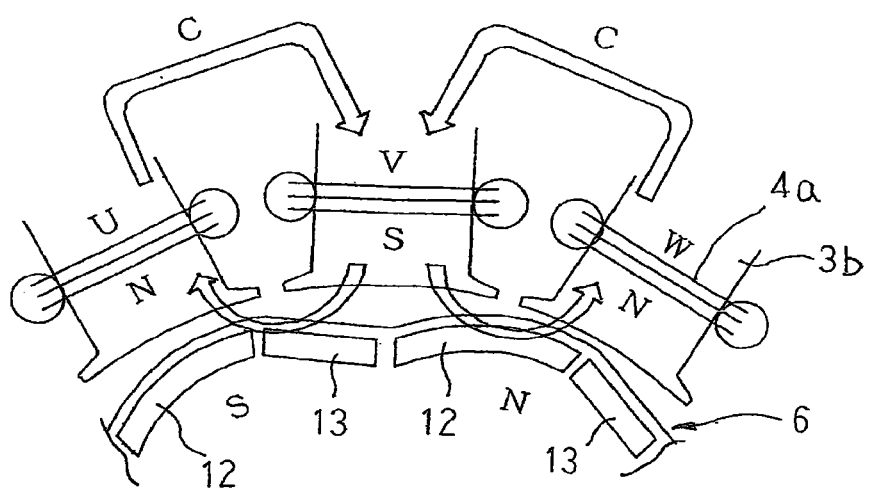
FIG. 6 is a schematic diagram that explains the demagnetizing mechanism in the rotor of the rotary electric motor according to Embodiment 1 of the present invention.

FIG. 1 is a cross section that schematically shows an overall configuration of a rotary electric machine according to Embodiment 1 of the present invention, FIG. 2 is a cross section that schematically shows a rotor of the rotary electric machine according to Embodiment 1 of the present invention, FIG. 3 is a partial cross section that explains a magnetic pole in the rotor of the rotary electric motor according to Embodiment 1 of the present invention, FIG. 4 is a partial cross section that explains directions of magnetization of magnets that constitute the magnetic poles in the rotor of the rotary electric motor according to Embodiment 1 of the present invention, and FIGS. 5 and 6 are schematic diagrams that each explain a demagnetizing mechanism in the rotor of the rotary electric motor according to Embodiment 1 of the present invention.

In FIG. 1, a rotary electric machine 1 is an automotive embedded permanent magnet rotary electric machine, and includes: a rotor 5 that is rotatably disposed in a housing (not shown); and a stator 2 that is disposed in the housing so as to surround the rotor 5. Now, automobiles predominantly move forward, and move in reverse much less frequently. Thus, when the rotary electric machine 1 is mounted to an automobile, the main direction of rotation of the rotor 5 is the direction of rotation when the automobile is moving forward, and because of that the "main direction of rotation B" according to the present invention means the direction of rotation when the automobile is moving forward.

As shown in FIG. 2, the rotor 5 includes: a rotor core 6 that is formed by laminating and integrating a large number of electromagnetic steel plates that have been punched into identical shapes, and that has an external shape in which a plurality of approximately circular arc-shaped curved surfaces 7 are arranged at a uniform angular pitch circumferentially; permanent magnets that are embedded into an inner circumferential side of each of the approximately circular arc-shaped curved surfaces 7 of the rotor core 6; and a rotating shaft 15 that is fixed to the rotor core 6 so as to be inserted through at a central axial position of the rotor core 6.

The rotor core 6 is produced so as to have an external shape that has eight contiguous convex surfaces in which the approximately circular arc-shaped curved surfaces 7 that constitute single magnetic poles are arranged circumferentially at a uniform angular pitch (a pitch of one magnetic pole). As shown in FIG. 3, the approximately circular arc-shaped curved surfaces 7 that constitute the respective convex surfaces are constituted by: a circular arc-shaped outer circumferential surface 8 that contacts a cylindrical surface of an outermost radius of the rotor core 6 at a pole center A, and that has a smaller radius than the outermost radius; and a flat outer circumferential surface 9 that links a trailing end portion of the circular arc-shaped outer circumferential surface 8 in the main direction of rotation B and a leading end portion of a neighboring circular arc-shaped outer circumferential surface 8 in the main direction of rotation B. Thus, an angle (a central angle) θ1 that is formed by line segments that pass through two ends of the circular arc-shaped outer circumferential surface 8 and the center of the rotor core 6 is 120 electrical degrees, and an angle (a central angle) θ2 that is formed by line segments that pass through two ends of the flat outer circumferential surface 9 and the center of the rotor core 6 is 60 electrical degrees. Moreover, θ1+θ2 is 180 electrical degrees, but because eight approximately circular arc-shaped curved surfaces 7 are arranged at a uniform angular pitch circumferentially, θ1+θ2 is 45 mechanical degrees. Hereinafter, θ1 and θ2 will be expressed as electrical angles. As shown in FIG. 3, the pole centers A are line segments that pass through circumferential centers of the approximately circular arc-shaped curved surfaces 7 and the center of the rotor core 6.

A first magnet insertion aperture 10 that is on the leading side in the main direction of rotation B and a second magnet insertion aperture 11 that is on the trailing side in the main direction of rotation B are formed so as to pass axially through an outer circumferential side of each of the magnetic poles of the rotor core 6. The first magnet insertion aperture 10 is formed so as to have a circular arc-shaped aperture shape that has a radial width h1, and is formed over almost an entire region that has a central angle θ1 (=120 degrees) at a position that is a distance b1 radially inward from the circular arc-shaped outer circumferential surface 8. The second magnet insertion aperture 11 is formed so as to have a rectangular aperture shape that has a radial width h1, and is formed over almost an entire region that has a central angle θ2 (=60 degrees) at a position that is a distance b1 radially inward from the flat outer circumferential surface 9.

The first permanent magnets 12 are formed into strip shapes that have circular arc-shaped cross sections that are identical to the first magnet insertion apertures 10, and are inserted into and fixed to the first magnet insertion apertures 10. The second permanent magnets 13 are formed into strip shapes that have rectangular cross sections that are identical to the second magnet insertion apertures 11, and are inserted into and fixed to the second magnet insertion apertures 11. As shown in FIG. 4, first permanent magnets 12 that constitute North-seeking (N) magnetic poles are magnetized such that the directions of magnetization 14 are oriented parallel to the pole centers A and radially outward. Similarly, as shown in FIG. 4, second permanent magnets 13 that constitute N poles are magnetized such that the directions of magnetization 14 are oriented parallel to the pole centers A and outward. Here, the magnetic force of the magnetized second permanent magnets 13 is a sum of a normal vector component Br of the flat outer circumferential surface 9 and a tangential vector component Bθ of the flat outer circumferential surface 9. The vector component Br is oriented outward in the normal direction, and the vector component Bθ is oriented toward the leading side in the main direction of rotation B. Here, magnets that have greater coercivity than the first permanent magnets 12 are used as the second permanent magnets 13.

Here, N39UH (a neodymium ultrahigh-temperature resistant type manufactured by Shin-Etsu Chemical Co., Ltd.), for example, can be used in the first permanent magnets 12, and N36Z (a neodymium ultrahigh-temperature resistant type manufactured by Shin-Etsu Chemical Co., Ltd.), which has greater coercivity than N39UH, for example, can be used in the second permanent magnets 13.

Moreover, because directions of magnetization 14 of the first permanent magnets 12 and the second permanent magnets 13 that constitute South-seeking (S) magnetic poles are reverse directions to the directions of magnetization 14 of the first permanent magnets 12 and the second permanent magnets 13 that constitute the N poles, the directions of the vector components Br and Bθ are also reversed, and explanation thereof will be omitted here.

The stator 2 is formed by laminating and integrating a large number of electromagnetic steel plates that have been punched into identical shapes, and includes: a stator core 3 that has: an annular core back 3a; and twelve teeth 3b that are disposed so as to extend radially inward from an inner circumferential surface of the core back 3a, and that are arranged at a uniform angular pitch circumferentially; and a stator coil 4 that is constituted by twelve concentrated winding coils 4a that are wound into a concentrated winding on each of the teeth 3b of the stator core 3.

A rotary electric machine 1 that is configured in this manner constitutes an 8-pole, 12-slot automotive embedded permanent magnet rotary electric machine, and the operation thereof and a demagnetizing mechanism will be explained with reference to FIGS. 5 and 6.

First, when the stator 2 and the rotor 5 are at positions that are shown in FIG. 5, current is passed through the concentrated winding coils 4a such that U-phase and W-phase concentrated winding coils 4a form S poles, and a V-phase concentrated winding coil 4a forms an N pole. A repulsive force is thereby generated between the first and second permanent magnets 12 and 13 that constitute an N pole and the tooth 3b on which the V-phase concentrated winding coil 4a is wound, and an attractive force is also generated between the first and second permanent magnets 12 and 13 that constitute the N pole and the tooth 3b on which the U-phase concentrated winding coil 4a is wound, applying a counterclockwise torque to the rotor 5.

The magnetic flux C that the concentrated winding coils 4a produce flows radially outward through the tooth 3b on which the V-phase concentrated winding coil 4a is wound. Then, a portion of the magnetic flux C that has flowed to the core back 3a flows through the core back 3a and enters the tooth 3b on which the U-phase concentrated winding coil 4a is wound, and a remaining portion thereof flows through the core back 3a and enters the tooth 3b on which the W-phase concentrated winding coil 4a is wound.

The magnetic flux C that enters the tooth 3b on which the U-phase concentrated winding coil 4a is wound flows radially inward through that tooth 3b, enters the rotor 5 from the tip end of that tooth 3b, enters the second permanent magnet 13 of the N pole from an end portion that is on the leading side of the second permanent magnet 13 in the main direction of rotation B, flows through the second permanent magnet 13 circumferentially, and then returns from the rotor 5 to the tooth 3b on which the V-phase concentrated winding coil 4a is wound.

At the same time, the magnetic flux C that enters the tooth 3b on which the W-phase concentrated winding coil 4a is wound flows radially inward through that tooth 3b, enters the rotor 5 from the tip end of that tooth 3b, enters the first permanent magnet 12 of the S pole from a vicinity of the pole center A, flows through the first permanent magnet 12 circumferentially, and then returns from the rotor 5 to the tooth 3b on which the V-phase concentrated winding coil 4a is wound.

Now, the magnetic flux C that enters the second permanent magnet 13 of the N pole flows through the second permanent magnet 13 toward the trailing side in the main direction of rotation B until radially inside the tooth 3b on which the V-phase concentrated winding coil 4a is wound. Here, because the magnetic flux C flows through the second permanent magnet 13 of the N pole toward the trailing side in the main direction of rotation B so as to oppose the vector component Bθ in the tangential direction of the flat outer circumferential surface 9, the second permanent magnet 13 is easily demagnetized.

On the other hand, the magnetic flux C that enters the first permanent magnet 12 of the S pole flows through the first permanent magnet 12 from the vicinity of the pole center A toward the leading side in the main direction of rotation B until radially inside the tooth 3b on which the V-phase concentrated winding coil 4a is wound. Here, the distance that the magnetic flux C flows through the first permanent magnets 12 of the S pole from the pole center A toward the leading side in the main direction of rotation B is significantly shorter than the distance that the magnetic flux C flows from the pole center A until radially inside the tooth 3b on which the V-phase concentrated winding coil 4a is wound. Consequently, in most of the pathway of the magnetic flux C that flows through the first permanent magnets 12 of the S pole toward the leading side in the direction of rotation B, the magnetic flux C flows in a similar or identical direction to the vector component Bθ in the tangential direction of the circular arc-shaped outer circumferential surface 8, and the first permanent magnet 12 is less likely to be demagnetized.

Next, when the rotor core 6 rotates counterclockwise, and the stator 2 and the rotor 5 are at positions that are shown in FIG. 6, current is passed through the concentrated winding coils 4a such that the U-phase and W-phase concentrated winding coils 4a form N poles, and the V-phase concentrated winding coil 4a forms an S pole. A repulsive force is thereby generated between the first and second permanent magnets 12 and 13 that constitute an S pole and the tooth 3b on which the V-phase concentrated winding coil 4a is wound, and an attractive force is also generated between the first and second permanent magnets 12 and 13 that constitute the S pole and the tooth 3b on which the U-phase concentrated winding coil 4a is wound, applying a counterclockwise torque to the rotor 5.

The magnetic flux C that the U-phase concentrated winding coil 4a produces flows radially outward through the tooth 3b on which the U-phase concentrated winding coil 4a is wound, flows through the core back 3a and enters the tooth 3b on which the V-phase concentrated winding coil 4a is wound. The magnetic flux C that enters the tooth 3b on which the V-phase concentrated winding coil 4a is wound flows radially inward through that tooth 3b, enters the rotor 5 from the tip end of that tooth 3b, enters the second permanent magnet 13 of the S pole from the leading side of the second permanent magnet 13 in the main direction of rotation B, flows through the second permanent magnet 13 circumferentially, and then returns from the rotor 5 to the tooth 3b on which the U-phase concentrated winding coil 4a is wound.

At the same time, the magnetic flux C that the W-phase concentrated winding coil 4a produces flows radially outward through the tooth 3b on which the W-phase concentrated winding coil 4a is wound, flows through the core back 3a and enters the tooth 3b on which the V-phase concentrated winding coil 4a is wound. The magnetic flux C that enters the tooth 3b on which the V-phase concentrated winding coil 4a is wound flows radially inward through that tooth 3b, enters the rotor 5 from the tip end of that tooth 3b, enters the first permanent magnet 12 of the N pole from a vicinity of the pole center A of the first permanent magnet 12, flows through the first permanent magnet 12 circumferentially, and then returns from the rotor 5 to the tooth 3b on which the W-phase concentrated winding coil 4a is wound.

Now, the magnetic flux C that enters the second permanent magnet 13 of the S pole flows through the second permanent magnet 13 toward the leading side in the main direction of rotation B until radially inside the tooth 3b on which the U-phase concentrated winding coil 4a is wound. Here, because the magnetic flux C flows through the second permanent magnet 13 of the S pole toward the leading side in the main direction of rotation B so as to oppose the vector component Bθ in the tangential direction of the flat outer circumferential surface 9, the second permanent magnet 13 is easily demagnetized.

On the other hand, the magnetic flux C that enters the first permanent magnet 12 of the N pole flows through the first permanent magnet 12 from the vicinity of the pole center A toward the trailing side in the main direction of rotation B until radially inside the tooth 3b on which the W-phase concentrated winding coil 4a is wound. Here, the distance that the magnetic flux C flows through the first permanent magnets 12 of the N pole from the pole center A toward the trailing side in the main direction of rotation B is significantly shorter than the distance that the magnetic flux C flows from the pole center A until radially inside the tooth 3b on which the W-phase concentrated winding coil 4a is wound. Consequently, in most of the pathway of the magnetic flux C that flows through the first permanent magnets 12 of the N pole toward the trailing side in the direction of rotation B, the magnetic flux C flows in a similar or identical direction to the vector component Bθ in the tangential direction of the circular arc-shaped outer circumferential surface 8, and the first permanent magnet 12 is less likely to be demagnetized.

Thus, it can be seen that in both cases the permanent magnets that are positioned on the trailing side in the main direction of rotation B, i.e., the second permanent magnets 13, are more likely to demagnetize.

According to Embodiment 1, because the first permanent magnets 12 are disposed within a range that has a central angle θ1 of 120 degrees of the magnetic poles, the first permanent magnets 12 are present at the pole centers A of the magnetic poles. In other words, the ribs that are constituted by the electromagnetic steel plates are not present at the pole centers A of the magnetic poles. Thus, because the peak of the magnetic flux that is produced by the permanent magnets is not reduced, and the magnetic flux that is produced by the permanent magnets does not have a point of abrupt change, magnetic flux harmonics are reduced. Thus, increases in torque ripples and cogging torque are suppressed, and core loss near the stator is also reduced.

Because the rotor core 6 is formed so as to have an external shape that has eight contiguous convex surfaces in which approximately circular arc-shaped curved surfaces 7 that constitute single magnetic poles are arranged at a uniform angular pitch circumferentially, the magnetic flux that is produced by the first and second permanent magnets 12 and 13 can be made to approximate a sine wave, enabling cogging torque and torque ripples to be reduced.

Because the permanent magnets that constitute the magnetic poles of the rotor 5 are divided into the first permanent magnets 12 and the second permanent magnets 13, stresses that act on the first permanent magnets 12 and the second permanent magnets 13 due to centrifugal forces are alleviated compared to when the permanent magnets that constitute the magnetic poles are formed by an integrated body, enabling the allowable rotational frequency to be increased.

Because the second permanent magnets 13 are formed into strip shapes that have a rectangular cross section, machining costs are less expensive.

Because the first and second permanent magnets 12 and 13 have different shapes, erroneous insertion into the first and second magnet insertion apertures 10 and 11 during assembly is eliminated, improving assembly.

Now, if the present rotary electric machine 1 is used in automobiles, the rotor 5 will rotate mainly in the direction of rotation when the automobile is moving forward, and the trailing side in the main direction of rotation B can be identified as a location at which at which the permanent magnets are more likely to demagnetize. Thus, the following effects can be achieved by limiting application of the present rotary electric machine 1 to automotive use:

Because the second permanent magnets 13, which are positioned on the trailing side in the main direction of rotation B, are formed by magnets that have greater coercivity, demagnetization of the second permanent magnets 13 can be suppressed.

Because the second permanent magnets 13, which are formed by magnets that have greater coercivity, are disposed within a range that has a central angle θ2 of 60 degrees on the trailing side in the main direction of rotation B, use of expensive magnets that have greater coercivity is reduced. Thus, cost increases due to countermeasures against demagnetizing can be suppressed. Magnets that have less coercivity also have greater residual magnetic flux density than magnets that have greater coercivity. Thus, use of magnets that have less residual magnetic flux density due to countermeasures against demagnetizing is reduced, enabling torque reduction to be suppressed.

Figure 7:
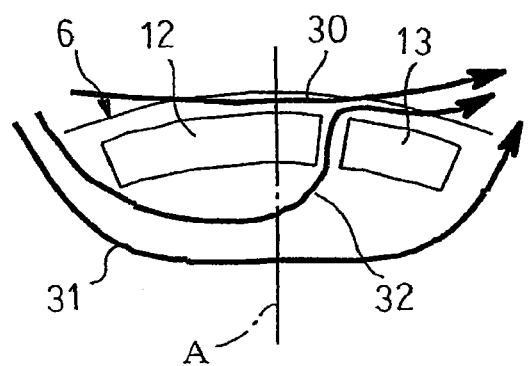
FIG. 7 is a schematic diagram that explains a reluctance torque generating mechanism in the rotor of the rotary electric motor according to Embodiment 1 of the present invention.

Next, effects that increase reluctance torque in the present rotary electric machine 1 will be explained with reference to FIG. 7. Here, FIG. 7 is a schematic diagram that explains a reluctance torque generating mechanism in the rotor of the rotary electric motor according to Embodiment 1 of the present invention.

Generally, torque in a rotary electric machine includes: magnetic torque that is generated by permanent magnets; and reluctance torque that arises as a result of differences in magnetic resistance in iron portions of the rotor. The closer to a front surface side of a rotor core that permanent magnets are embedded, the greater the magnetic torque in the rotary electric machine. In the present rotary electric machine 1, because the first permanent magnets 12 and the second permanent magnets 13 are embedded convexly on the front surface side of the rotor core 6, the distance between the first permanent magnets 12 and the second permanent magnets and the outer circumferential surface of the rotor core 6 is reduced, increasing magnetic torque.

The greater the magnetic flux that flows in between poles from between poles, the greater the reluctance torque. In the present rotary electric machine 1, the first and second permanent magnets 12 and 13 that are disposed so as to line up circumferentially are asymmetric relative to the pole centers A. In other words, the circumferential magnetic flux distribution in an air gap portion between the rotor 5 and the stator 2 is asymmetric relative to the pole centers A. Thus, as shown in FIG. 7, there are three routes for the magnetic flux to flow in between poles from between poles.

The first route 30 is a route that passes through between the outer circumferential surfaces of the first and second permanent magnets 12 and 13 and the rotor core 6. Because this first route 30 has little iron, is magnetically saturated, and easily increases magnetic resistance, its contribution to reluctance torque is small. The second route 31 is a route that passes through the first and second permanent magnets 12 and 13 and a radially inner side of the rotor core 6. Because this second route 31 is magnetically saturated, and passes twice between poles that easily increase magnetic resistance, its contribution to reluctance torque is small. The third route 32 is a route that enters radially inside the rotor core 6 from between poles on one side, passes radially inside the first permanent magnets 12, passes between the first permanent magnets 12 and the second permanent magnets 13, and flows radially outside the second permanent magnets 13. Because the first permanent magnets 12 and the second permanent magnets 13 are like poles, there is no magnetic saturation of the iron portions between the first permanent magnets 12 and the second permanent magnets 13, reducing magnetic resistance.

Consequently, in the present rotary electric machine 1, even though the first permanent magnets 12 and the second permanent magnets 13 are embedded convexly on the front surface side of the rotor core 6, because the magnetic flux flows mainly through the third route 32, which is magnetically saturated, and that only passes once between poles where magnetic resistance is easily increased, reluctance torque can be increased while ensuring a large magnetic torque.

In the invention that is described in Patent Literature 1, on the other hand, because the magnetic poles are configured by disposing pairs of permanent magnets that are formed so as to have an identical shape so as to line up circumferentially, the pairs of permanent magnets that are disposed so as to line up circumferentially are symmetrical relative to the pole centers. Thus, the iron portions between the permanent magnets are present at the pole centers, but because iron portions that are positioned at the pole centers do not contribute to reluctance torque, the reluctance torque cannot be increased.

Moreover, in the present invention, application of the present rotary electric machine 1 is limited to automotive use, but when a vehicle is moving in reverse, which has a lower frequency of use, there is a risk that magnet portions may demagnetize on the trailing side in the direction of rotation when reversing. Thus, when the vehicle is moving in reverse, it is preferable to control the passage of electric current to the concentrated winding coils such that the magnetic flux that is produced by the concentrated winding coils does not contact trailing corner portions of the first permanent magnets in the direction of rotation when the vehicle is reversing.

In Embodiment 1 above, the directions of magnetization of the second permanent magnets, which are disposed on the trailing sides in the main direction of rotation, are parallel to the pole centers A, but as a countermeasure against demagnetizing of the second permanent magnets, it is desirable for the second permanent magnets to be magnetized such that the directions of magnetization are inclined toward the trailing side in the main direction of rotation B relative to directions that are parallel to the pole centers A, in other words, such that the angles that are formed by the directions of magnetization and the normal directions at the outer circumferential surface of the rotor core at central positions of the second permanent magnets in the main direction of rotation B are less than the angles that are formed by the directions that are parallel to the pole centers A and those normal directions. The normal vector component Br of the magnetic forces of the magnetized second permanent magnets thereby becomes greater than the tangential vector component Bθ. In other words, because the magnetic flux that has flowed through the second permanent magnets until radially inside the teeth flows from the second permanent magnets in the normal direction and enters the teeth, the magnetic flux flows in an identical direction to the direction of Br. Thus, because the orientation of the resultant vector can be set to an orientation in which demagnetization is less likely by increasing Br, demagnetization resisting characteristics can be improved.

In Embodiment 1 above, the first permanent magnets are disposed within a region that has a central angle of 120 degrees on the leading side in the main direction of rotation B, but the central angle θ1 of the regions of disposal of the first permanent magnets is not limited to 120 degrees. If the central angle θ1 is less than or equal to 90 degrees, then the ribs that are constituted by the electromagnetic steel plates are present at the pole centers A, increasing the magnetic flux harmonics, and also increasing torque ripples and togging torque, and the use of magnets that have greater coercivity is also increased, raising costs, and reducing torque. If the central angle θ1 is greater than or equal to 150 degrees, then the trailing side of the first permanent magnets in the main direction of rotation B will demagnetize. In other words, it is preferable for the central angle θ1 of the regions of disposal of the first permanent magnets to be an angular range that is greater than 90 degrees and less than 150 degrees.

Embodiment 2

Figure 8:
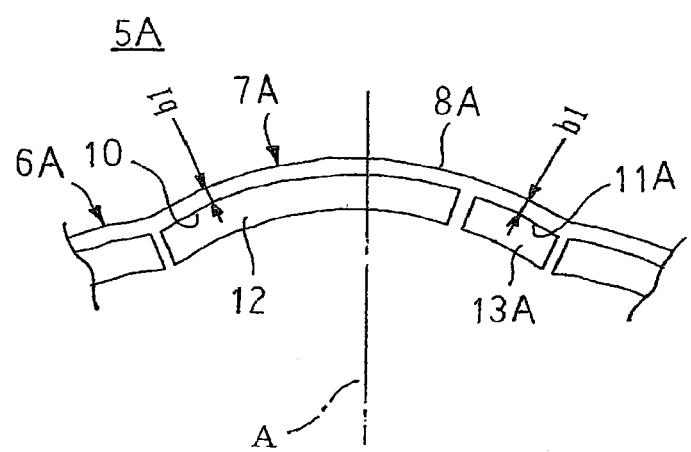
FIG. 8 is a partial cross section that explains disposition of magnets that constitute magnetic poles in a rotor of a rotary electric motor according to Embodiment 2 of the present invention.
Figure 9:
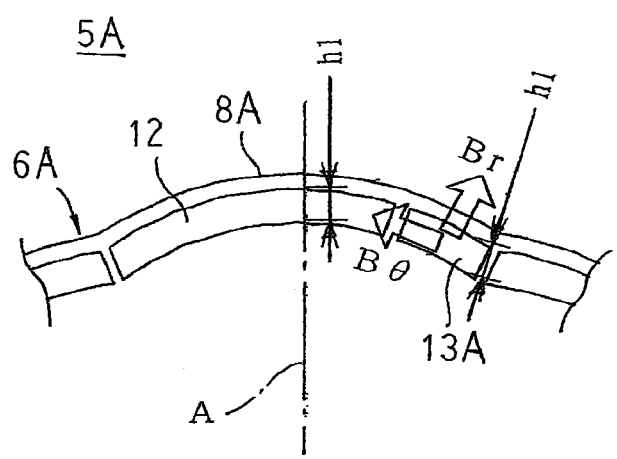
FIG. 9 is a partial cross section that explains directions of magnetization of second permanent magnets that constitute the magnetic poles in the rotor of the rotary electric motor according to Embodiment 2 of the present invention.

FIG. 8 is a partial cross section that explains disposition of magnets that constitute magnetic poles in a rotor of a rotary electric motor according to Embodiment 2 of the present invention, and FIG. 9 is a partial cross section that explains directions of magnetization of second permanent magnets that constitute the magnetic poles in the rotor of the rotary electric motor according to Embodiment 2 of the present invention.

In FIG. 8, approximately circular arc-shaped curved surfaces 7A that constitute single magnetic poles in a rotor core 6A are constituted only by a circular arc-shaped outer circumferential surface 8 that contacts a cylindrical surface of an outermost radius of the rotor core 6A at a pole center A, and that has a smaller radius than the outermost radius.

Second magnet insertion apertures 11A on trailing sides in a main direction of rotation B are formed so as to have a circular arc-shaped aperture shape that has a radial width h1, and are formed over almost entire regions that have central angles $\theta 2$ (=60 degrees) at positions that are a distance b1 radially inward from the circular arc-shaped outer circumferential surfaces 8.

Second permanent magnets 13A are formed into strip shapes that have circular arc-shaped cross sections that are identical to the second magnet insertion apertures 11A, and are inserted into and fixed to the second magnet insertion apertures 11A. As shown in FIG. 9, the second permanent magnets 13A that constitute the magnetic poles of the N poles are magnetized such that the directions of magnetization 14 are oriented parallel to the pole centers A and outward. Here, the magnetic force of the magnetized second permanent magnets 13A is a sum of an outward-facing normal vector component Br of the circular arc-shaped outer circumferential surface 8 and a tangential vector component B$\theta$ of the circular arc-shaped outer circumferential surface 8. Here, magnets that have greater coercivity than the first permanent magnets 12 are used as the second permanent magnets 13A.

Moreover, because directions of magnetization 14 of the first permanent magnets 12 and the second permanent magnets 13A that constitute South-seeking (S) magnetic poles are reverse directions to the directions of magnetization 14 of the first permanent magnets 12 and the second permanent magnets 13A that constitute the N poles, the directions of the vector components Br and B$\theta$ are also reversed, and explanation thereof will be omitted here.

The rest of the configuration of a rotor 5A according to Embodiment 2 is configured in a similar or identical manner to that of the rotor 5 according to Embodiment 1 above.

In Embodiment 2, magnets that constitute magnetic poles are divided into first permanent magnets 12 and second permanent magnets 13A, the first permanent magnets 12 are disposed within a range that has a central angle $\theta 1$ (=120 degrees) on the leading side in the main direction of rotation B, and the second permanent magnets 13A are disposed within a range that has a central angle $\theta 2$ (=60 degrees) on the trailing side in the main direction of rotation B. In addition, the second permanent magnets 13A that are disposed on the trailing side in the main direction of rotation B are formed using magnets that have greater coercivity. Consequently, similar or identical effects to those of Embodiment 1 above can also be achieved in Embodiment 2.

Embodiment 3

Figure 10:
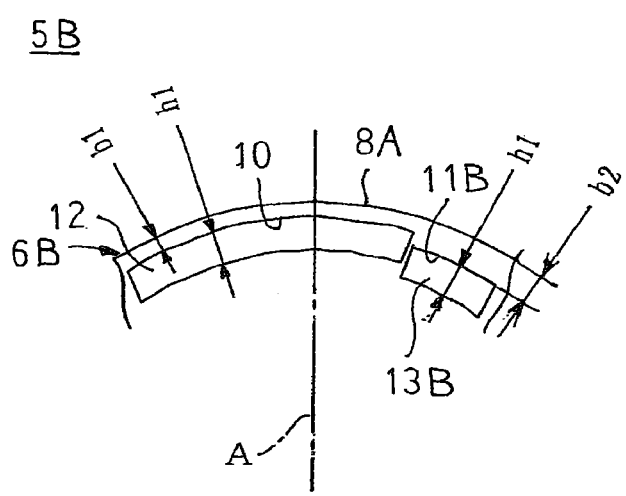
FIG. 10 is a partial cross section that explains disposition of magnets that constitute magnetic poles in a rotor of a rotary electric motor according to Embodiment 3 of the present invention.

FIG. 10 is a partial cross section that explains disposition of magnets that constitute magnetic poles in a rotor of a rotary electric motor according to Embodiment 3 of the present invention.

In FIG. 10, second magnet insertion apertures 11B on trailing sides in a main direction of rotation B are formed so as to have a circular arc-shaped aperture shape that has a radial width h1, and are formed over almost entire regions that have central angles $\theta 2$ (=60 degrees) at positions that are a distance b2 radially inward from the circular arc-shaped outer circumferential surfaces 8 on a rotor core 6B. Moreover, the distance b2 is greater than a distance b1.

Second permanent magnets 13B are formed into strip shapes that have circular arc-shaped cross sections that are identical to internal shapes of the second magnet insertion apertures 11B using magnets that have coercivity that is equal to that of the first permanent magnets 12, and are inserted into and fixed to the second magnet insertion apertures 11B.

Moreover, a rotor 5B according to Embodiment 3 is configured in a similar or identical manner to the rotor 5A according to Embodiment 2 above except that the second permanent magnets 13B are produced using magnets that have coercivity that is equal to that of the first permanent magnets 12, and embedding depths of the second permanent magnets 13B are deeper than embedding depths of the first permanent magnets 12.

Consequently, similar effects to those in Embodiment 2 above can also be achieved in Embodiment 3.

According to Embodiment 3, focus is placed on the fact that the concentrated winding coils 4a are concentrated winding coils, i.e., the magnetic flux that is produced by the concentrated winding coils passes through the front surface side of the rotor 5B, and does not enter as far as internal portions of the rotor 5B, and the second permanent magnets 13B are embedded at a depth (b2) to which the magnetic flux that is produced by the concentrated winding coils 4a does not reach. Thus, because the second permanent magnets 13B are not exposed to the magnetic flux that is produced by the concentrated winding coils 4a, it is not necessary to use magnets that have greater coercivity as the second permanent magnets 13B, enabling further cost reductions to be achieved. In addition, because magnets that have less residual magnetic flux density are not used as the second permanent magnets 13B, there is no torque reduction due to countermeasures against demagnetizing.

Moreover, in Embodiment 3 above, magnets that have low coercivity that is equal to the first permanent magnets are used as the second permanent magnets, but demagnetization resisting characteristics are improved further if magnets that have greater coercivity are used as the second permanent magnets.

Embodiment 4

Figure 11:
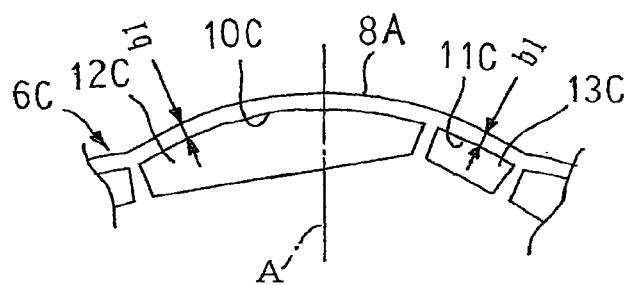
FIG. 11 is a partial cross section that explains disposition of magnets that constitute magnetic poles in a rotor of a rotary electric motor according to Embodiment 4 of the present invention.

FIG. 11 is a partial cross section that explains disposition of magnets that constitute magnetic poles in a rotor of a rotary electric motor according to Embodiment 4 of the present invention.

In FIG. 11, first magnet insertion apertures 10C on leading sides in a main direction of rotation B are formed so as to have an aperture shape in which a radially outer side forms a circular arc-shaped curved surface and a radially inner side forms a flat surface, and are formed over almost entire regions that have central angles $\theta 1$ (=120 degrees) at positions that are a distance b1 radially inward from circular arc-shaped outer circumferential surfaces 8A on a rotor core 6C. Second magnet insertion apertures 11C on trailing sides in the main direction of rotation B are formed so as to have an aperture shape in which a radially outer side forms a circular arc-shaped curved surface and a radially inner side forms a flat surface, and are formed over almost entire regions that have central angles $\theta 2$ (=60 degrees) at positions that are a distance b1 radially inward from the circular arc-shaped outer circumferential surfaces 8A on the rotor core 6C.

The first permanent magnets 12C are formed into strip shapes that have cross-sectional shapes that are identical to the first magnet insertion apertures 10C, and are inserted into and fixed to the first magnet insertion apertures 10C. The second permanent magnets 13C are formed into strip shapes that have cross-sectional shapes that are identical to the second magnet insertion apertures 11C, and are inserted into and fixed to the second magnet insertion apertures 11C. Here, magnets that have greater coercivity than the first permanent magnets 12C are used as the second permanent magnets 13C.

Moreover, the rest of the configuration of a rotor 5C according to Embodiment 4 is configured in a similar or identical manner to that of the rotor 5A according to Embodiment 2 above.

Consequently, similar effects to those in Embodiment 2 above can also be achieved in Embodiment 4.

According to Embodiment 4, because the radially inner sides of the first and second permanent magnets 12C and 13C are formed so as to have flat surfaces, machining is improved, enabling cost reductions.

Embodiment 5

Figure 12:
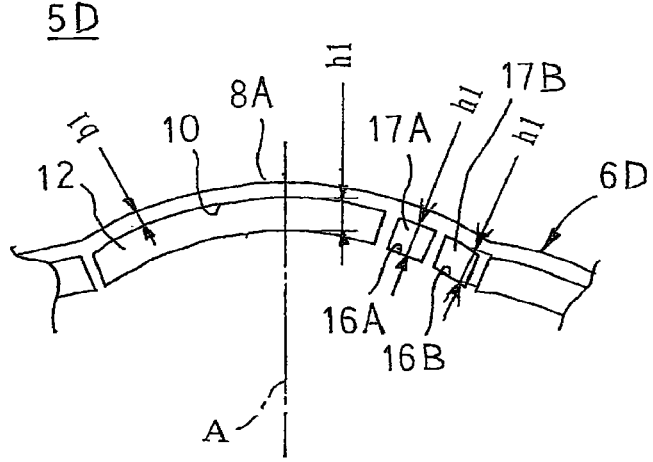
FIG. 12 is a partial cross section that explains disposition of magnets that constitute magnetic poles in a rotor of a rotary electric motor according to Embodiment 5 of the present invention.

FIG. 12 is a partial cross section that explains disposition of magnets that constitute magnetic poles in a rotor of a rotary electric motor according to Embodiment 5 of the present invention.

In FIG. 12, first divided magnet insertion apertures 16A and second divided magnet insertion apertures 16B are formed so as to have identical or similar circular arc-shaped aperture shapes that have a radial width h1, and are formed so as to line up circumferentially over almost entire regions that have central angles θ2 (=60 degrees) on trailing sides in the main direction of rotation B at positions that are a distance b1 radially inward from the circular arc-shaped outer circumferential surfaces 8 on a rotor core 6D. Moreover, the first divided magnet insertion apertures 16A and the second divided magnet insertion apertures 16B constitute second magnet insertion apertures that are on the trailing side in the main direction of rotation B.

First divided permanent magnets 17A and second divided permanent magnets 17B are formed into strip shapes that have cross-sectional shapes that are identical to the first divided magnet insertion apertures 16A and the second divided magnet insertion aperture 16B, and are respectively inserted into and fixed to the first divided magnet insertion apertures 16A and the second divided magnet insertion aperture 16B. Here, the coercivity of the first permanent magnets 12 is less than the coercivity of the first divided permanent magnets 17A, which is less than or equal to the coercivity of the second divided permanent magnets 17B.

Moreover, the rest of the configuration of a rotor 5D according to Embodiment 5 is configured in a similar or identical manner to that of the rotor 5A according to Embodiment 2 above.

Consequently, similar effects to those in Embodiment 2 above can also be achieved in Embodiment 5.

According to Embodiment 5, because the coercivity of the first permanent magnets 12 is less than the coercivity of the first divided permanent magnets 17A, which is less than or equal to the coercivity of the second divided permanent magnets 17B, demagnetization resisting characteristics that are similar or identical to those of Embodiment 2 can be achieved.

Moreover, in Embodiment 5 above, second permanent magnets are constituted by first and second divided permanent magnets, but the number of second permanent magnet sections may also be three or more. In that case, the divided permanent magnets are arranged in the main direction of rotation such that coercivity on the trailing side in the main direction of rotation is greater than or equal to coercivity on the leading side.

Embodiment 6

Figure 13:
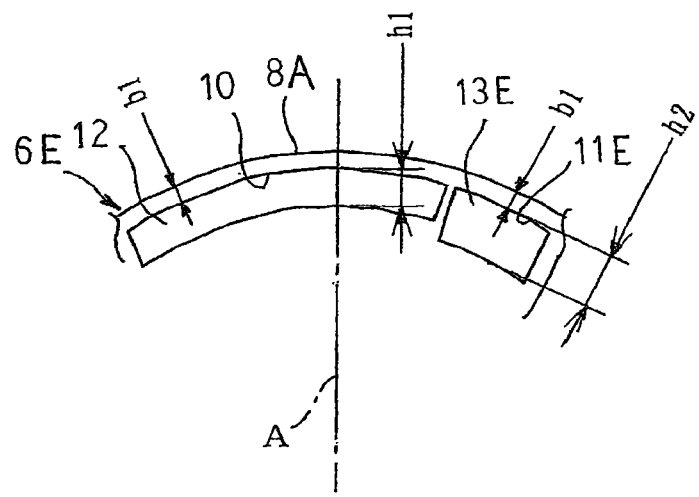
FIG. 13 is a partial cross section that explains disposition of magnets that constitute magnetic poles in a rotor of a rotary electric motor according to Embodiment 6 of the present invention.

FIG. 13 is a partial cross section that explains disposition of magnets that constitute magnetic poles in a rotor of a rotary electric motor according to Embodiment 6 of the present invention.

In FIG. 13, second magnet insertion apertures 11E on trailing sides in a main direction of rotation B are formed so as to have a circular arc-shaped aperture shape that has a radial width h2, and are formed over almost entire regions that have central angles θ2 (=60 degrees) at positions that are a distance b1 radially inward from the circular arc-shaped outer circumferential surfaces 8A on a rotor core 6E. Here, the radial width h2 is greater than a radial width h1.

Second permanent magnets 13E are formed into strip shapes that have circular arc-shaped cross sections that are identical to internal shapes of the second magnet insertion apertures 11E using magnets that have coercivity that is equal to that of the first permanent magnets 12, and are inserted into and fixed to the second magnet insertion apertures 11E.

Moreover, the rest of the configuration of a rotor 5E according to Embodiment 6 is configured in a similar or identical manner to that of the rotor 5A according to Embodiment 2 above.

Consequently, similar effects to those in Embodiment 2 above can also be achieved in Embodiment 6.

According to Embodiment 6, because the radial widths of second permanent magnets 13E that are more likely to demagnetize are enlarged, improved demagnetization resisting characteristics can be ensured without using magnets that have greater coercivity as the second permanent magnets 13E. In addition, because magnets that have less residual magnetic flux density are not used as the second permanent magnets 13E, there is no torque reduction due to countermeasures against demagnetizing. Moreover, demagnetization resisting characteristics can be further improved if magnets that have greater coercivity are used as the second permanent magnets 13E.

Because the radial widths of the second permanent magnets 13E are different than the first permanent magnets 12, erroneous insertion of the magnets into the magnet insertion apertures is eliminated, improving workability during assembly.

Embodiment 7

Figure 14:
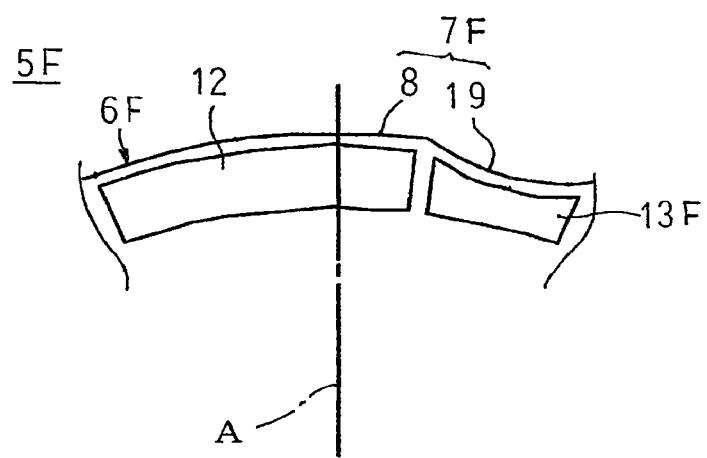
FIG. 14 is a partial cross section that explains disposition of magnets that constitute magnetic poles in a rotor of a rotary electric motor according to Embodiment 7 of the present invention.

FIG. 14 is a partial cross section that explains disposition of magnets that constitute magnetic poles in a rotor of a rotary electric motor according to Embodiment 7 of the present invention.

In FIG. 14, approximately circular arc-shaped curved surfaces 7F are constituted by: a circular arc-shaped outer circumferential surface 8; and a concave surface 19 that links a trailing end portion of the circular arc-shaped outer circumferential surface 8 in the main direction of rotation B and a leading end portion of a neighboring circular arc-shaped outer circumferential surface 8 in the main direction of rotation B. Second permanent magnets 13F are embedded in a rotor core 6F so as to be positioned radially inside the concave surface 19. Here, magnets that have coercivity that is equal to that of first permanent magnets 12 are used as the second permanent magnets 13F.

Moreover, a rotor 5F according to Embodiment 7 is configured in a similar or identical manner to the rotor 5 according to Embodiment 1 above except that the approximately circular arc-shaped curved surfaces 7F are constituted by the circular arc-shaped outer circumferential surfaces 8 and the concave surfaces 19.

Consequently, similar effects to those in Embodiment 1 above can also be achieved in Embodiment 7.

According to Embodiment 7, because external surfaces of the rotor core 6F that are radially outside the second permanent magnets 13F are formed into concave surfaces 19, air gap portions between the rotor 5F and the stator 2 radially outside the second permanent magnets 13F are wider than air gap portions between the rotor 5F and the stator 2 radially outside the first permanent magnets 12. Thus, magnetic resistance in the air gap portions between the rotor 5F and the stator 2 radially outside the second permanent magnets 13F is increased, and the magnetic flux that the stator 2 produces is less likely to strike the second permanent magnets 13F, improving demagnetization resisting characteristics.

Embodiment 8

Figure 15:
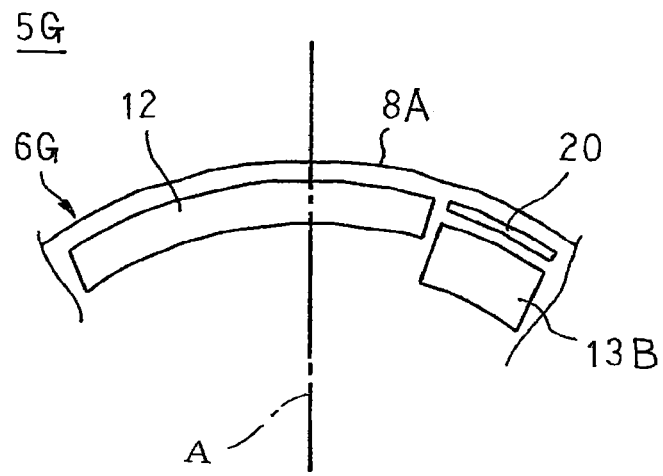
FIG. 15 is a partial cross section that explains disposition of magnets that constitute magnetic poles in a rotor of a rotary electric motor according to Embodiment 8 of the present invention.

FIG. 15 is a partial cross section that explains disposition of magnets that constitute magnetic poles in a rotor of a rotary electric motor according to Embodiment 8 of the present invention.

In FIG. 15, a demagnetization suppressing aperture 20 is disposed so as to pass through a rotor core 6G radially outside a second permanent magnet 13 so as to have an aperture direction in an axial direction.

Moreover, a rotor 5G according to Embodiment 8 is configured in a similar or identical manner to the rotor 5B according to Embodiment 3 above except that the demagnetization suppressing apertures 20 are disposed so as to pass through the rotor core 6G radially outside the second permanent magnets 13B so as to have aperture directions in an axial direction.

Consequently, similar effects to those in Embodiment 3 above can also be achieved in Embodiment 8.

In Embodiment 8, because the demagnetization suppressing apertures 20 are disposed so as to pass through the rotor core 6G radially outside the second permanent magnets 13B so as to have aperture directions in an axial direction, layers of air, which constitute non-magnetic bodies, are formed on the outer circumferential sides of the second permanent magnets 13B, increasing magnetic resistance between the outer circumferential surface of the rotor core 6G and the second permanent magnets 13B, and the magnetic flux that the stator 2 produces is less likely to strike the second permanent magnets 13B, improving demagnetization resisting characteristics.

Moreover, in Embodiment 8 above, the demagnetization suppressing apertures are hollow, but the demagnetization suppressing apertures may also be filled with non-magnetic bodies of copper, etc. In that case, because the non-magnetic bodies are disposed so as to pass axially through regions of the rotor core that are radially outside the second permanent magnets, increasing magnetic resistance between the outer circumferential surface of the rotor core and the second permanent magnets, demagnetization resisting characteristics are improved.

Embodiment 9

Figure 16:
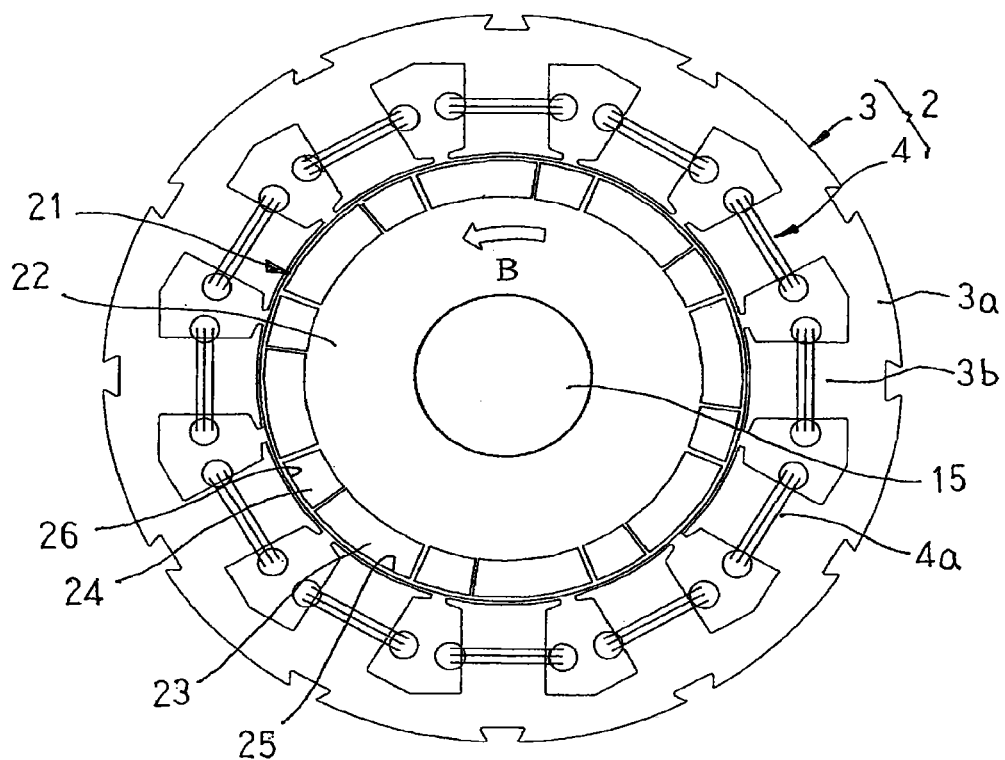
FIG. 16 is a cross section that schematically shows an overall configuration of a rotary electric machine according to Embodiment 9 of the present invention.

FIG. 16 is a cross section that schematically shows an overall configuration of a rotary electric machine according to Embodiment 9 of the present invention.

In FIG. 16, a rotary electric machine 1A includes: a rotor 21; and a stator 2 that is disposed on the housing so as to surround the rotor 21.

The rotor 21 includes: a rotor core 22 that is formed into an annular shape by laminating and integrating a large number of electromagnetic steel plates that have been punched into identical shapes; permanent magnets that are embedded into an outer circumferential side of the rotor core 22; and a rotating shaft 15 that is fixed to the rotor core 22 so as to be inserted through at a central axial position of the rotor core 22.

Eight pairs of first magnet insertion apertures 25 that are on the leading side in the main direction of rotation B and second magnet insertion apertures 26 that are on the trailing side in the main direction of rotation B are respectively formed so as to pass axially through an outer circumferential side of the rotor core 22 at a uniform angular pitch. The first magnet insertion apertures 25 are formed so as to have circular arc-shaped aperture shapes that have a radial width h1, and are formed over almost entire regions that have a central angle $\theta 1$ (=120 degrees) at positions that are a distance b1 radially inward from an outer circumferential surface of the rotor core 22. The second magnet insertion apertures 26 are formed so as to have circular arc-shaped aperture shapes that have a radial width h1, and are formed over almost entire regions that have a central angle $\theta 2$ (=60 degrees) at positions that are a distance b1 radially inward from an outer circumferential surface of the rotor core 22.

The first permanent magnets 23 are formed into strip shapes that have circular arc-shaped cross sections that are identical to the first magnet insertion apertures 25, and are inserted into and fixed to the first magnet insertion apertures 25. The second permanent magnets 26 are formed into strip shapes that have rectangular cross sections that are identical to the second magnet insertion apertures 26, and are inserted into and fixed to the second magnet insertion apertures 26. First permanent magnets 23 that constitute N poles are magnetized such that the directions of magnetization are oriented parallel to pole centers A and radially outward. Second permanent magnets 24 that constitute N poles are magnetized such that the directions of magnetization are oriented parallel to the pole centers A and outward. Here, directions of magnetization of first permanent magnets 23 and second permanent magnets 24 that constitute S poles are reverse directions to the directions of magnetization of the first permanent magnets 23 and second permanent magnets 24 that constitute the N poles. Here, magnets that have greater coercivity than the first permanent magnets 23 are used as the second permanent magnets 24.

Moreover, Embodiment 9 is configured in a similar or identical manner to that of Embodiment 1 above except that the rotor core 21 is configured into an annular shape.

A rotary electric machine 1A that is configured in this manner constitutes an 8-pole, 12-slot automotive embedded permanent magnet rotary electric machine.

In this rotary electric machine 1A, first and second permanent magnets 23 and 24 are embedded in a shape that is convex radially outward toward a surface of a rotor core 6 to constitute magnetic poles, the first permanent magnets 23 are formed over almost entire regions that have a central angle $\theta 1$ (=120 degrees), and magnets that have greater coercivity than the first permanent magnets 23 are used in the second permanent magnets 24. Consequently, similar or identical effects to those of Embodiment 1 above can also be achieved in Embodiment 9.

According to Embodiment 9, because an annular rotor core 21 is used, machining of the rotor core 21 is facilitated, enabling cost reductions.

Now, in Embodiment 9, an annular rotor core is used instead of the rotor core in Embodiment 1 above, which has an external shape in which approximately circular arc-shaped curved surfaces are arranged at a uniform angular pitch circumferentially, but similar or identical effects can also be achieved using an annular rotor core instead of the rotor cores in Embodiments 2 through 8 above.

Moreover, in each of the above embodiments, an 8-pole, 12-slot automotive embedded permanent magnet rotary electric machine has been explained, but the number of poles and number of slots in the automotive embedded permanent magnet rotary electric machine are not limited to eight poles and twelve slots, and may also be eight poles and six slots, for example.

In Embodiments 3, 4, 6, and 7 above, the second permanent magnets are formed in an integrated body, but the second permanent magnets may also be constituted by a plurality of magnets that are arranged in a row in the main direction of rotation.

REFERENCE SIGNS LIST

2 STATOR; 3 STATOR CORE; 3A CORE BACK; 3B TOOTH; 4 STATOR COIL; 4A CONCENTRATED WINDING COIL; 5, 5A, 5B, 5C, 5D, 5E, 5F, 5G, 21 ROTOR; 6, 6A, 6B, 6C, 6D, 6E, 6F, 6G, 22 ROTOR CORE; 7, 7A, 7F APPROXIMATELY CIRCULAR ARC-SHAPED CURVED SURFACE; 12, 23 FIRST PERMANENT MAGNET; 13, 13A, 13B, 13C, 13E, 13F, 24 SECOND PERMANENT MAGNET; 17A FIRST DIVIDED PERMANENT MAGNET (SECOND PERMANENT MAGNET); 17B SECOND DIVIDED PERMANENT MAGNET (SECOND PERMANENT MAGNET); 20 AIR APERTURE; A POLE CENTER; B MAIN DIRECTION OF ROTATION.

The invention claimed is:

1. An automotive embedded permanent magnet rotary electric machine comprising:
a rotor comprising:
a rotor core; and
a plurality of permanent magnets that are embedded in said rotor core so as to be positioned on a radially inner side of said rotor core,
adjacent permanent magnets being magnetized so as to have different polarities from each other to constitute magnetic poles; and
a stator comprising:
a stator core in which teeth are respectively arranged at a uniform angular pitch circumferentially so as to extend radially inward from an annular core back; and
a stator coil that is wound onto said stator core,
said stator being disposed so as to surround said rotor, wherein:
each of said permanent magnets that constitute said magnetic poles comprises a first permanent magnet and a second permanent magnet that are embedded so as to line up in a main direction of rotation of said magnetic poles of said rotor core so as to be radially outwardly convex in a region that extends from a leading end portion to a trailing end portion in said main direction of rotation of said magnetic poles;
said first permanent magnet is formed into an integrated body that extends from said leading end portion beyond a pole center toward said trailing side in said main direction of rotation of said magnetic poles; and
a magnetic path for generating reluctance torque is provided between said first permanent magnet and said second permanent magnet.

2. The automotive embedded permanent magnet rotary electric machine according to claim 1, wherein:
said rotor core comprises an outer circumferential surface that is constituted by a plurality of convex surfaces in which approximately circular arc-shaped curved surfaces are arranged continuously at a uniform angular pitch circumferentially; and
said permanent magnets that constitute said magnetic poles are respectively embedded in said rotor core so as to be positioned on a radially inner side of said approximately circular arc-shaped curved surfaces.

3. The automotive embedded permanent magnet rotary electric machine according to claim 1, wherein a circumferential magnetic flux distribution in an air gap portion between said rotor and said stator is asymmetrical relative to said pole center.

4. The automotive embedded permanent magnet rotary electric machine according to claim 1, wherein said second permanent magnet is formed using a magnet that has greater coercivity than said first permanent magnet.

5. The automotive embedded permanent magnet rotary electric machine according to claim 4, wherein said second permanent magnet is constituted by a plurality of divided permanent magnets that are arranged in a row in said main direction of rotation.

6. The automotive embedded permanent magnet rotary electric machine according to claim 5, wherein said plurality of divided permanent magnets are arranged in a row in said main direction of rotation such that coercivity on a trailing side of adjacent divided permanent magnets is greater than or equal to coercivity on a leading side.

7. The automotive embedded permanent magnet rotary electric machine according to claim 1, wherein said second permanent magnet is embedded at a position that is deeper than said first permanent magnet.

8. The automotive embedded permanent magnet rotary electric machine according to claim 7, wherein a non-magnetic body is disposed so as to pass axially through a region of said rotor core that is radially outside said second permanent magnet.

9. The automotive embedded permanent magnet rotary electric machine according to claim 1, wherein an air gap between said rotor and said stator that is radially outside said second permanent magnet is wider than an air gap between said rotor and said stator that is radially outside said first permanent magnet.

10. The automotive embedded permanent magnet rotary electric machine according to claim 9, wherein an external surface of said rotor core that is radially outside said second permanent magnet is formed so as to have a concave surface.

11. The automotive embedded permanent magnet rotary electric machine according to claim 1, wherein said second permanent magnet is formed so as to have a greater radial thickness than said first permanent magnet.

12. The automotive embedded permanent magnet rotary electric machine according to claim 1, wherein said second permanent magnet is magnetized such that an angle that is formed between a direction of magnetization and a normal of an outer surface of said rotor core at a central position of a region of disposal of said second permanent magnet in said main direction of rotation is smaller than an angle that is formed between a direction that is parallel to said pole center and said normal of said outer surface of said rotor core at said central position of said region of disposal of said second permanent magnet in said main direction of rotation.

13. The automotive embedded permanent magnet rotary electric machine according to claim 1, wherein said stator coil is constituted by concentrated winding coils that are wound onto each of said teeth.

* * * * *